United States Patent [19]

Delitsky

[11] Patent Number: 4,894,169

[45] Date of Patent: Jan. 16, 1990

[54] METHOD OF INHIBITING IRON SALT DEPOSITION IN AQUEOUS SYSTEMS USING UREA SALTS

[75] Inventor: Mona Delitsky, Pasadena, Calif.

[73] Assignee: Merck & Co., Inc., Rahway, N.J.

[21] Appl. No.: 257,253

[22] Filed: Oct. 13, 1988

Related U.S. Application Data

[63] Continuation-in-part of Ser. No. 177,191, Apr. 4, 1988, abandoned.

[51] Int. Cl.$^4$ ................................................ C02F 5/12
[52] U.S. Cl. ...................................... 210/698; 252/180
[58] Field of Search ............................... 210/697–701; 252/180, 181, 390, 394; 422/16

[56] References Cited

U.S. PATENT DOCUMENTS

| | | | |
|---|---|---|---|
| 2,106,513 | 1/1938 | Allison | 210/754 |
| 2,739,871 | 3/1956 | Senkus | 252/390 |
| 3,514,376 | 5/1970 | Salutsky | 210/701 |
| 3,959,167 | 5/1976 | Hwa et al. | 210/699 |
| 4,512,813 | 4/1985 | Young | 134/137 |
| 4,537,684 | 8/1985 | Gallup et al. | 210/696 |
| 4,552,665 | 11/1985 | Ralston et al. | 210/697 |
| 4,640,793 | 2/1987 | Persinski et al. | 210/696 |
| 4,673,522 | 6/1987 | Young | 252/148 |
| 4,744,949 | 5/1988 | Hoots et al. | 210/697 |
| 4,756,888 | 7/1988 | Gallup et al. | 210/702 |

*Primary Examiner*—Peter Hruskoci
*Attorney, Agent, or Firm*—Manfred Polk; Joseph F. DiPrima

[57] ABSTRACT

This invention relates to a method of inhibiting deposition or precipitation of iron salts in aqueous systems which comprises adding a urea salt to said systems.

5 Claims, No Drawings

METHOD OF INHIBITING IRON SALT DEPOSITION IN AQUEOUS SYSTEMS USING UREA SALTS

CROSS REFERENCE TO RELATED APPLICATIONS

This is a continuation-in-part of U.S. application Ser. No. 177,191, filed on Apr. 4, 1988 now abandoned.

BACKGROUND OF THE INVENTION

This invention relates to a method of inhibiting deposition or precipitation of iron salts in aqueous systems which comprises adding a urea salt to said systems.

The literature discloses numerous references for scale and corrosion inhibition and iron stabilization in aqueous systems by employing polymers or copolymers of sulfonic acid/acrylic acid (SA/AA) or acrylic acid/hydroxy propyl acrylate (AA/HPA) as well as polyphosphates and phosphonates. For example, see below:

(1) U.S. Pat. No. 4,640,793 discloses an admixture, and its use in inhibiting scale and corrosion in aqueous systems comprising:
  (a) a water-soluble polymer having a weight average molecular weight of less than 25,000, as determined by low angle laser light scattering, comprising an unsaturated carboxylic acid and an unsaturated sulfonic acid, or their salts, having a ratio of 1:20 to 20:1, and
  (b) at least one compound selected from the group consisting of water-soluble polycarboxylates, phosphonates, phosphates, polyphosphates, metal salts and sulfonates.

Said patent is also directed to a method of inhibiting the formation of insoluble alluvial, metal oxide, and metal hydroxide deposits in an aqueous system, comprising adding to the system at least 0.1 mg/l of a water-soluble polymer having a weight average molecular weight of less than 25,000, as determined by low angle laser light scattering, comprising an unsaturated carboxylic acid and an unsaturated sulfonic acid, or their salt, having a ratio of 1:20 to 20:1 and a phosphate.

(2) U.S. Pat. No. 3,959,167 (1976)—discloses a method for using a new improved composition for inhibiting or preventing accumulation of scale or the like on heating surfaces in an aqueous system. The composition includes an acrylic polymer, a water-soluble chelant, and an organophosphonic acid and/or their water-soluble salts. In a preferred embodiment, the composition is composed of sodium polymethylacrylate, nitrilotriacetic acid and hydroxyethylidene diphosphonic acid as its water-soluble salts.

(3) U.S. Pat. No. 4,552,665 (1985)—discloses a process for inhibiting the precipitation of dissolved manganese ion and its reaction products in aqueous solutions, comprising adding to said aqueous solution 0.1 to 20 ppm of a copolymer of an unsaturated carboxylic acid or salt selected from the group consisting of acrylic acid and methacrylic acid and an unsaturated sulphonic acid or salt selected from the group consisting of 2-acrylamido-2-methylpropylsulphonic acid and 2-methacrylamido-2-methylpropylsulphonic acid.

(4) U.S. Pat. No. 4,537,684 discloses a method for controlling the deposition of metal-containing scales, such as iron silicate scale, from a hot, aqueous, geothermal brine or the like, without substantial corrosion of brine handling equipment. The brine is contacted with (1) an amount of an acid sufficient to reduce the pH of the brine between 0.1 and 0.5 unit and (2) a greater than stoichiometric amount of a reducing agent for reducing trivalent iron and manganese cations in a high temperature brine solution to divalent ions. An overall decrease in scale deposition, especially of iron silicate scale, is achieved while a silver-rich scale can be recovered from silver-containing brines.

SUMMARY OF THE INVENTION

It has been found that certain water soluble urea salts are capable of keeping iron in solution, thereby serving as inhibitors in preventing said iron salts from precipitating or depositing on to surfaces of aqueous systems, particular heat transfer surfaces. Therefore, it is an object of this invention to provide a process wherein urea salts are effectively employed as an iron inhibitor in aqueous systems.

A further object of the invention is to provide an effective amount of urea salts that inhibit iron deposits in aqueous systems.

Further objects will become apparent from the description which follows.

DESCRIPTION OF THE INVENTION

Urea salts have been found to have a significant and unexpected property in inhibition of iron in aqueous systems. The urea salts disclosed herein increase the amount of iron that will remain in solution in said aqueous system, thereby preventing iron deposits therein. Alternatively, said urea salts can be added directly or in accordance with the concept of the invention disclosed herein to aqueous systems.

Generally, the concept of this invention is best demonstrated by dissolving a urea salt in deionized water and adding an iron generating substance (such as ferric chloride from a 1000 mg/l atomic spectral standard) followed by an equimolar quantity of a phosphate ion ($PO_4^=$) generating substance. This solution is neutralized, volume adjusted with deionized water and allowed to stand for approximately 24 hours, filtered and aliquots taken for iron analysis by atomic absorption. Dissolved iron values greater than those obtained when no urea salt was present indicate stabilization.

The iron inhibitors (urea salts) employed herein are not critical. Any water soluble urea salts can be used. Representative salts employed herein are nitrates, disodium salts, sulfates, and derivatives thereof. The effective concentration limits of urea salts wherein improvement in iron stabilization is shown in as little as 10 mg/l. A more effective concentration is from 15-200 mg/l. The preferred concentration ranges between 40 mg/l and 200 mg/l.

The phrase "inhibiting the precipitation" is meant to include threshold inhibition, dispersion, solubilization, particle size reduction, or reaction product change.

The phrase "aqueous system" is meant to include any system containing water; including, but not limited to, cooling water, boiler water, desalination systems, gas scrubbers, blast furnaces, sewage sludge thermal conditioning equipment, reverse osmosis, sugar evaporators, paper processing, mining circuits and the like.

Some studies which further exemplify the concepts of the invention are described below.

IRON STABILIZATION

In the course of an investigation to find iron phosphate inhibitors, it was noted that certain urea salts have the ability to inhibit the precipitation of iron salts in aqueous systems. Since iron fouling can be a problem in industrial cooling water operations, the use of an inexpensive compound to keep iron solubilized would be advantageous.

EXAMPLE I

Deionized water was added to 600 ml beakers. Urea nitrate was then dissolved in the deionized water at the desired concentration. Iron, as $FeCl_3$ (from a 1000 mg/l atomic spectral standard), was added next, followed by a quantity of $Na_2HPO_4$ to yield an amount of $PO_4^=$ equimolar to the iron. The solution was water white at this point with a pH of approximately 2. The pH was adjusted with dilute sodium hydroxide to 7, giving the solution a yellow cast, and the volume adjusted to 500 ml with deionized water. The solution was covered and allowed to sit for 24 hours, filtered through 2.5 micron paper, and aliquots taken for analysis of iron by atomic absorption. Dissolved iron values greater than those obtained when no urea salt was present indicate stabilization. The results are described in Tables I and II below.

TABLE I

| Concentration of Urea $NO_3$ (mg/l) | Initial Fe, (mg/l) | Concentration of Fe Remaining in Solution after 24 Hours (mg/l) |
|---|---|---|
| 0 | 10 | 0.05 |
| 11 | 10 | 1.30 |
| 22 | 10 | 1.70 |
| 44 | 10 | 2.40 |
| 66 | 10 | 5.40 |
| 165 | 10 | 7.50 |

TABLE II

| Concentration of Urea $SO_4$ (mg/l) | Initial Fe, (mg/l) | Concentration of Fe Remaining in Solution after 24 Hours (mg/l) |
|---|---|---|
| 0 | 10 | 0.05 |
| 22 | 10 | 0.40 |
| 44 | 10 | 3.20 |
| 110 | 10 | 1.90 |

The above tables give the amount of dissolved iron found by atomic absorption analysis of filtered samples taken after 24 hours. Initial iron was 10 mg/l, which drops to <0.05 mg/l in the absence of any inhibitor. At higher urea nitrate concentrations, iron is kept soluble much above the control (untreated) test.

Also, urea salts show an inhibitory effect on iron phosphate, as orthophosphate iron ($PO_4^=$) and showed an increase in solubility as compared with the control (untreated) test shown in Table III below.

TABLE III

| Urea $NO_3$ (mg/l) | Initial Fe, (mg/l) | Initial $PO_4^=$ (mg/l) | Dissolved Phosphate Remaining in Solution after 24 Hours (mg/l) |
|---|---|---|---|
| 0 | 17 | 17 | 7.00 |
| 11 | 17 | 17 | 8.48 |
| 44 | 17 | 17 | 10.10 |

What is claimed is:

1. A method for inhibiting precipitation of iron salts including iron phosphate in an aqueous system, said method comprising adding to said system an effective amount of a water soluble urea salt selected from the group consisting of urea nitrate, urea disodium salt and urea sulfate at concentrations ranging from 10 mg/l to 400 mg/l.

2. The method of claim 1, wherein the concentration ranges from 40 mg/l to 200 mg/l.

3. The method of claim 2, wherein said salt is urea nitrate.

4. The method of claim 2, wherein said salt is urea sulfate.

5. The method of claim 2, wherein said salt is urea disodium salt.

* * * * *

UNITED STATES PATENT AND TRADEMARK OFFICE
CERTIFICATE OF CORRECTION

PATENT NO. : 4,894,169

DATED : January 16, 1990

INVENTOR(S) : Mona Delitsky

It is certified that error appears in the above-identified patent and that said Letters Patent is hereby corrected as shown below:

Title page, [73] Assignee: reads Merck & Co. Inc., Rahway, New Jersey, please change to read --Calgon Corporation, Pittsburgh, Pa.--

Signed and Sealed this

Eighteenth Day of June, 1991

Attest:

HARRY F. MANBECK, JR.

Attesting Officer

Commissioner of Patents and Trademarks